United States Patent [19]

Lacroix et al.

[11] 4,179,267
[45] Dec. 18, 1979

[54] STABLE, HIGHLY CONCENTRATED DYESTUFF SOLUTIONS MISCIBLE WITH WATER IN ANY PROPORTION

[75] Inventors: Roger Lacroix, Huningue, France; Hans Mollet, Reinach, Switzerland

[73] Assignee: Ciba-Geigy Corporation, Ardsley, N.Y.

[21] Appl. No.: 663,419

[22] Filed: Mar. 3, 1976

Related U.S. Application Data

[63] Continuation of Ser. No. 377,881, Jul. 9, 1973, abandoned.

[30] Foreign Application Priority Data

Jul. 14, 1972 [CH] Switzerland ............... 10605/72
Jun. 7, 1973 [CH] Switzerland ............... 8257/73

[51] Int. Cl.$^2$ ............... C09B 5/62; D06P 1/02
[52] U.S. Cl. ............... 8/41 R; 8/8 R; 8/171; 8/172 R
[58] Field of Search ............... 8/39 R, 39 C, 85, 172, 8/173, 41 R, 41 C, 89 A

[56] References Cited

U.S. PATENT DOCUMENTS

| 2,888,313 | 5/1959 | Mautner | 8/54 |
|---|---|---|---|
| 3,391,985 | 7/1968 | Zurbuchen | 8/86 |
| 3,623,834 | 5/1970 | Seuret | 8/41 R |
| 3,637,340 | 1/1972 | Mollet | 8/166 |
| 3,671,176 | 6/1972 | Kaufmann | 8/39 |
| 3,809,533 | 5/1974 | Srevenpipe | 8/41 R |
| 3,887,329 | 6/1975 | Heyar | 8/171 |
| 3,901,648 | 8/1975 | Arbaud | 8/172 A |
| 3,963,430 | 6/1976 | Nonn et al. | 8/41 R |

FOREIGN PATENT DOCUMENTS

| 56286 | 12/1970 | Australia . | |
| 1069574 | 5/1967 | United Kingdom . | |
| 1301724 | 1/1973 | United Kingdom | 8/173 |

Primary Examiner—Donald Levy
Attorney, Agent, or Firm—Edward McC. Roberts

[57] ABSTRACT

Stable, highly concentrated dyestuff solutions which are miscible with water in any proportion are described and which contain at least one azo or nitro dyestuff containing sulphonic acid groups or at least one anthraquinone dyestuff dissolved in a solvent mixture consisting of an aprotic solvent or a mixture of aprotic solvents, a glycol ether and optionally water, e.g. N-methylpyrrolidone/diethylene glycol monomethyl ether which mixture exhibits a pronounced synergetic effect with regard both to the solubility of the dyestuffs and to the stability of the dyestuff solution.

These dyestuff solutions are suitable for the production of dye solution for the dyeing or printing of in particular, natural or synthetic nitrogen containing organic fibers especially polyamide carpets.

7 Claims, No Drawings

STABLE, HIGHLY CONCENTRATED DYESTUFF SOLUTIONS MISCIBLE WITH WATER IN ANY PROPORTION

This is a continuation of application Ser. No. 377,881, filed on July 9, 1973, now abandoned.

The present invention relates to stable, highly concentrated dyestuff solutions of azo and nitro dyestuffs containing sulphonic acid groups as well as of anthraquinone dyestuffs, which solutions are miscible with water in any proportion; to a process for the production of these dyestuff solutions; and also to the use of these dyestuff solutions for the preparation of dye baths for the dyeing or printing of textile material made particularly from organic fibres containing nitrogen.

Many dyestuffs are supplied commercially usually as dried and finely ground powders, which have to be dissolved or dispersed in the dye bath before dyeing is performed. This form of application, however, has considerable disadvantages: Apart from the unpleasant creation of dust occurring during weighing out, transference or charging of the intensely coloured dyestuff powders, and the risk of the finely ground dyestuff powders becoming caked as a result of the action of moisture or heat under unsuitable storage conditions, there is a further disadvantage in that serious difficulties are met with in effecting the dissolving or dispersion of the said powders in the dye bath, since the dyestuffs are in most cases insufficiently water-soluble, particularly when high dyestuff concentrations are required, such as, e.g. in the case of continuous dyeing or of printing. Unsettled and skittery dyeings or printings are obtained as a result of an inadequately fine distribution of the undissolved dyestuff particles in a padding liquor or printing paste.

It has therefore already been suggested that dyestuffs be employed in the form of concentrated solutions. It is possible by this means to avoid certain disadvantages, such as, e.g. the creation of dust and the difficulties associated with the dissolving of powders, which occur with the use of dyestuff powders. Such solutions which have already been described include concentrated, heat- and frost-resistant stock solutions of 2:1-metal complexes of azo dyestuffs and of anthraquinone dyestuffs.

Furthermore, there are described in DOS No. 1,794,132 solutions of specific acid anthraquinone dyestuffs in an organic solvent or solvent mixture.

It has now been found that it is possible to obtain highly concentrated solutions also of azo and nitro dyestuffs containing sulphonic acid groups, advantageously monosulphonic acid groups, as well as of anthraquinone dyestuffs, which solutions are stable in storage between $-20°$ C. and $+50°$ C. and miscible with water in any proportion. The solvents used for the purpose are mixtures according to the invention consisting of an aprotic solvent or a mixture of aprotic solvents, a glycol or glycol ether and optionally water. This solvent mixture exhibits, in particular, a pronounced synergetic effect with regard both to the solubility of the dyestuffs and to the stability of the dyestuff solution.

No such synergetic effect with respect to stability and increase in degree of concentration could be observed in the aforementioned DOS No. 1,794,132; and nowhere is there mention of such an effect.

As solvent medium, there are used according to the invention mixtures producing this synergism which consist of an aprotic solvent or a mixture of aprotic solvents, as well as a glycol or glycol ether and optionally water.

The dyestuff solutions contain the dyestuffs as defined preferably in amounts of 10 to 60%, especially of 30 to 50%. The applicable solvent mixture is composed advantageously of 5 to 60, particularly 15 to 50, percent by weight of an aprotic solvent of mixtures thereof, 15 to 50 percent by weight of a glycol or glycol ether and 0 to 50 percent by weight of water.

It is not possible in general to produce with the individual components of the stated solvent mixture highly concentrated solutions of these dyestuffs; and such solutions have poor stability in storage. Surprisingly, however, the solvent combination according to the invention exhibits, particularly in the given proportions, and especially in the case of these commercial dyestuffs, pronounced synergetic solubility effects, and hence renders possible for the first time the production of the stable, highly concentrated dyestuff solutions miscible with water in any proportion which had been sought for these classes of dyestuffs.

The azo and nitro dyestuffs containing sulphonic acid groups can be used according to the invention in the form of their free sulphonic acids, advantageously, however, in the form of their metal salts, e.g. sodium, potassium or magnesium salts.

Applicable azo dyestuffs containing sulphonic acid groups are disazo dyestuffs, particularly, however, monoazo dyestuffs, which belong, for example, to the benzene-azo-benzene, benzene-azo-naphthalene, naphthalene-azo-naphthalene, benzene-azo-pyrazolone, benzene-azo-aminopyrazole, benzene-azo-acetoacetic acid amide, benzene-azobenzene-azo-benzene, benzene-azo-naphthalene-azo-benzene or benzene-azo-benzene-azo-naphthalene series, and which can further contain substituents, preferably alkyl or alkoxy groups having 1 to 6 carbon atoms, halogen atoms such as chlorine, bromine or fluorine, or nitro groups.

As nitro dyestuffs containing sulphonic acid groups, mention may be made, in particular, of nitrodiphenylamine compounds, which can contain further substituents, e.g. amino groups. The mentioned dyestuffs can also be used as mixtures with each other.

From the point of view of colour, the anthraquinone dyestuffs can belong to the widest variety of classes. The dyestuffs concerned are, in particular, acid dyestuffs. And from the chemical point of view, those of particular interest are 1-amino-4-arylamino-anthraquinones, which can have in the 2-position also a sulphonic acid group.

Applicable aprotic solvents usable according to the invention are, for example, the following: water-soluble compounds or mixtures thereof liquid at normal temperature: nitrogen-containing compounds such as N,N,N',N'-tetramethylurea, N-methylpyrrolidone and 1,5-dimethylpyrrolidone; sulphur-containing compounds such as sulpholane (tetramethylenesulphone) and sulpholene (2,3- or 2,5-dihydrothiophene-S-dioxide) and their derivatives substituted in the $\alpha$- and/or $\beta$-position particularly by alkyl or hydroxyalkyl groups, and dimethylsulphoxide; as well as phosphorus-containing compounds such as hexamethylphosphoric acid triamide and bis-(dimethylamido)-methanephosphate.

Of the stated aprotic solvents, those preferred are dimethylsulphoxide, N-methylpyrrolidone and tetramethylurea or mixtures of these solvents.

Glycols or glycol ethers usable according to the invention are, e.g.: ethylene glycol, 1,2-propylene glycol, diethylene glycol, triethylene glycol and tetraethylene glycol, 2-methylpentanediol-3,4, ethylene glycol monomethyl ether, -ethyl ether or -n-butyl ether, diethylene glycol monomethyl ether, -ethyl ether or -butyl ether, diethylene glycol monoethyl ether acetate, triethylene glycol monobutyl ether, dipropylene glycol, glycerin, glycerin-1,3-diethyl ether or thiodiglycol.

Of the stated glycols or glycol ethers, those preferably used are: ethylene glycol, diethylene glycol, triethylene glycol, tetraethylene glycol, ethylene glycol monomethyl ether, ethylene glycol monoethyl ether, diethylene glycol monomethyl ether, diethylene glycol monoethyl ether and diethylene glycol mono-n-butyl ether, or mixtures of these glycols and glycol ethers.

Mixtures of these solvents which particularly produce the synergetic effect are N-methylpyrrolidone/diethylene glycol monomethyl ether; tetramethylurea/diethylene glycol monomethyl ether; N-methylpyrrolidone/tetraethylene glycol and tetramethylurea/diethylene glycol monobutyl ether.

The dyestuff solutions according to the invention can in addition contain soluble additives such as urea, pentaerythrite, anti-foaming agents, dispersing agents, etc.

The dyestuff solutions according to the invention are obtained by the dissolving of the dyestuffs as defined, preferably in dried powder form, in the described solvent mixture, optionally at elevated temperature, e.g. at 20° to 100° C. The dissolving temperature and time depend on the dyestuff used and on the solvent mixture. Both values can be easily determined by preliminary tests.

There is obtained, if necessary after removal by filtration of the insoluble fractions, such as, e.g. inorganic salts, impurities, etc., a storage-stable, highly concentrated and homogeneous dyestuff solution which, even after three months of storage at a temperature of up to 50° C., shows no signs of crystallisation or decomposition.

By the use of solutions, the risk, frequently present in the case of dispersions, of flocculation and sedimentation is avoided.

In continuous dyeing, the application of highly concentrated dyestuff solutions greatly facilitates the preparation of padding liquors. This is of particular advantage where, for example, floor coverings made from polyamide fibre material, such as tufted carpets or needle felt carpets, are being continuously dyed in large lengths, with several cubic meters of padding liquor being required per batch.

The dyestuff solutions according to the invention are miscible with water in any proportion, without precipitation of the dyestuff, and can be easily measured out volumetrically, irrespective of whether they are diluted with water or poured into water. The addition of the dyestuff solutions according to the invention to the liquor can be made even at room temperature without the danger of lumpiness occurring. In the case of dyestuff preparations in powder form, however, it is often necessary to prepare, before addition of the dyestuff to the dyebath, a stock solution in water at elevated temperature, in order to ensure that the dyestuffs are completely dissolved or dispersed in the dye bath.

The dyestuff solutions according to the invention can also be measured out automatically, e.g. in dosing pumps, and are therefore of great value in automatic dyeing.

Furthermore, they are especially suitable for the production of dye solutions for the dyeing or printing of, in particular, natural or synthetic, nitrogen-containing, organic fibres, especially polyamide carpets; but they are also suitable for other purposes, such as, e.g. for the production of inks, or printing inks for recording instruments, printing pads, typewriter ribbons, etc.

In the following examples, which illustrate the invention without its scope being limited to them, the term 'parts' denotes, where not otherwise stated, parts by weight, and temperatures are expressed in degrees Centigrade.

EXAMPLE 1

41 Parts of the dry dyestuff of the formula

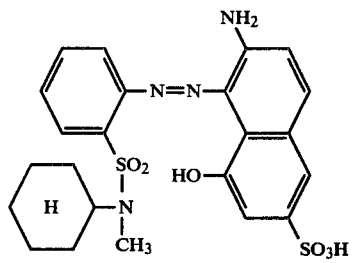

are added at room temperature to a mixture of 25 parts of tetramethylurea, 18 parts of dimethylsulphoxide and 16 parts of diethylene glycol monomethyl ether; the mixture is then stirred for one hour at room temperature and the residue remaining subsequently removed by filtration. The dyestuff does not crystallise out from the thus obtained solution even after a storage time of 3 months at temperatures of −20°, 25° and 50°.

If this dyestuff solution is poured into water, there immediately occurs a homogeneous dispersion.

The good storage stability is obtained only when in the stated solvent mixture the proportion of tetramethylurea is at least 25% and that of dimethylsulphoxide lower than 20%.

EXAMPLE 2

46 Parts of the dry dyestuff of the formula

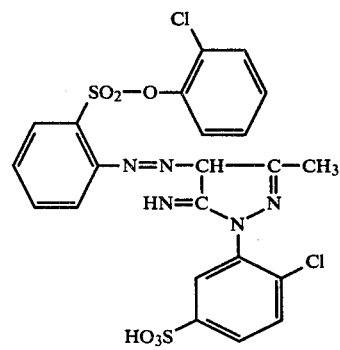

are added at room temperature to a solvent mixture consisting of 23.5 parts of water, 23.5 parts of ethylene glycol monoethyl ether and 7 parts of dimethylsulphoxide; the mixture is stirred for one hour, whereby the dyestuff goes into solution, and is then filtered. There remains on filtration virtually no residue on the filter. The obtained solution is thinly liquid, storage-stable, miscible with water in any proportion and has an extremely high stability.

EXAMPLE 3

A very storage-stable solution is obtained by the addition at room temperature of 31 parts of the dry dyestuff of the formula

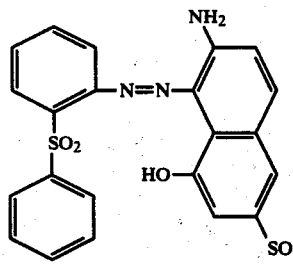

to a mixture of 20 parts of N-methylpyrrolidone and 49 parts of diethylene glycol monomethyl ether. After completed addition of the dyestuff, the mixture is stirred for 2 hours at room temperature, and the undissolved salt removed by filtration, whereby practically no residue remains on the filter.

It is indeed possible to produce a highly concentrated solution with diethylene glycol monomethyl ether alone, but which is not stable in storage. An addition of 20% of N-methylpyrrolidone is necessary in order to ensure stability and immediate dilution with water.

EXAMPLE 4

A very stable solution is obtained by the addition of 34 parts by the dyestuff of the formula

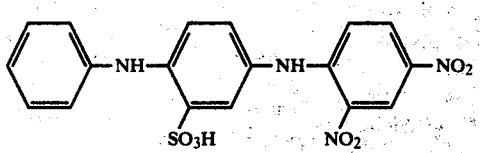

to a mixture of 32 parts of dimethylsulphoxide and 34 parts of ethylene glycol monomethyl ether.

There is obtained, with the procedure otherwise as described in Example 1, a highly concentrated dyestuff solution which is stable during months of storage.

The stability of the solution is obtained only when the content of dimethylsulphoxide is above 30%. Moreover, it is impossible to produce in one of the stated solvents alone such a highly concentrated dyestuff solution.

EXAMPLE 5

A stable solution is obtained with the procedure as described in Example 1, but with the use in this case of 44 parts of the dyestuff of the formula

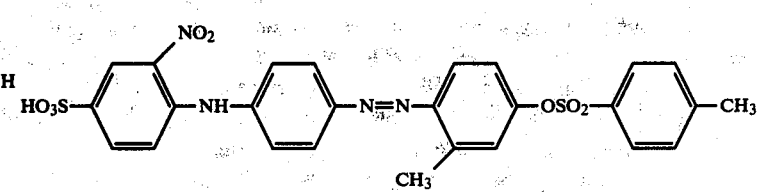

and a mixture of 16 parts of dimethylsulphoxide and 41 parts of ethylene glycol monomethyl ether.

The addition of at least 15% of dimethylsulphoxide is necessary in this case too in order to obtain a stable solution.

EXAMPLE 6

28 Parts of the dry dyestuff of the formula

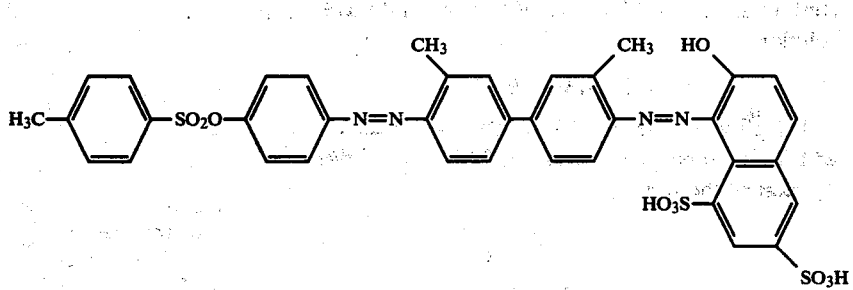

are added at room temperature to a solvent mixture consisting of 50 parts of N-methylpyrrolidone and 22 parts of diethylene glycol monomethyl ether; the mixture is then stirred for one hour, whereby the dyestuff goes into solution, and the obtained solution filtered. There remains after filtration virtually no residue on the filter. The resulting solution is thinly liquid, storage stable and miscible with water in any proportion.

It is not possible to produce a so highly concentrated dyestuff solution in one of the stated solvents alone.

EXAMPLE 7

29 Parts of the dry dyestuff of the formula

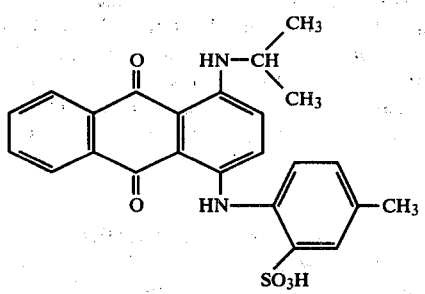

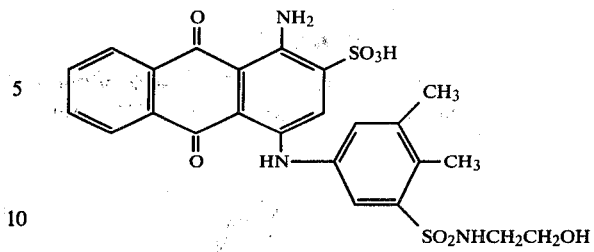

are added at room temperature to a mixture of 25 parts of N-methylpyrrolidone and 46 parts of diethylene glycol momomethyl ether; the mixture is stirred for one hour at room temperature, and the residue remaining then removed by filtration. The dyestuff does not crystallise out from the obtained solution even after a storage time of 6 months and at temperatures of −20°, 25° and 50°.

If the dyestuff solution is poured into water, there immediately occurs a homogeneous dispersion.

A dyestuff solution having similarly good properties is obtained if in the above example of N-methylpyrrolidone is replaced by corresponding amounts of tetramethylurea, with the procedure otherwise the same. If the solvents are used singly instead of as a mixture, then it is not possible to obtain such a high solubility of the dyestuffs or any improvement of the stability of the dyestuff solution.

EXAMPLE 8

A highly storage-stable solution is obtained by the addition at room temperature of 24.5 parts of the dry dyestuff of the formula

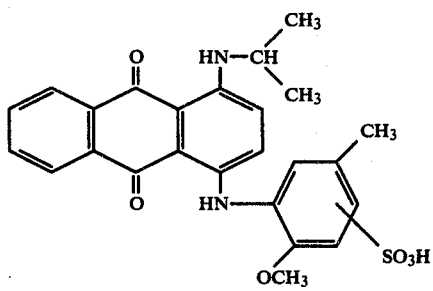

to a mixture of 30 parts of N-methylpyrrolidone and 45.5 parts of tetraethylene glycol. After completed addition of the dyestuff, the mixture is stirred for one hour at 60° to 70°; the undissolved salt is then removed by filtration, whereby virtually no residue remains on the filter. It is indeed possible to produce a highly concentrated solution using tetraethylene glycol alone, but the solution is not stable in storage. An addition of 30% of N-methylpyrrolidone is necessary in order to ensure the stability and the instantaneous dilutability with water.

EXAMPLE 9

23 Parts of the dry dyestuff powder of the formula are added at 50° to 60° to a solvent mixture consisting of 25 parts of N-methylpyrrolidone and 52 parts of tetraethylene glycol; the mixture is stirred for one hour, whereby the dyestuff goes into solution, and the solution is then filtered. There remains after filtration virtually no residue on the filter. The obtained solution is stable in storage and miscible with water in any proportion.

EXAMPLE 10

A very stable solution is obtained by addition of 29 parts of the dyestuff powder of the formula

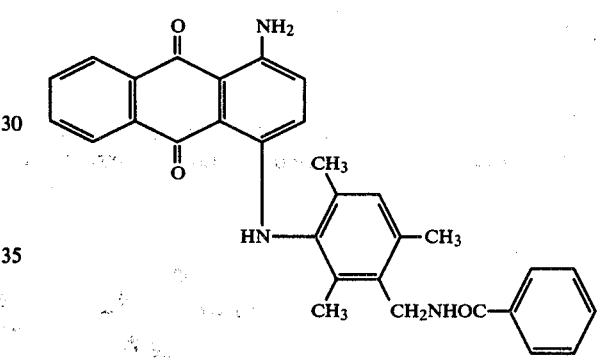

to a mixture of 10 parts of tetramethylurea and 61 parts of diethylene glycol monobutyl ether.

With the procedure otherwise as described in Example 7 there is thus obtained a highly concentrated dyestuff solution which is stable during months of storage.

The obtained solution is thinly liquid, storage-stable and miscible with water in any proportion.

We claim:

1. A stable water-miscible dyestuff solution containing 10–60% by weight of a non-metallized dyestuff, containing a sulfonic acid group and selected from the group consisting of an azo dyestuff and a nitro dyestuff, dissolved in a mixed solvent consisting of an aprotic solvent or a mixture of aprotic solvents selected from the group consisting of dimethylsulfoxide, N-methylpyrrolidone and tetramethylurea each of said aprotic solvent or mixture of said solvents "being mixed with" together with a water-miscible glycol or glycol ether and 0 to 50% water.

2. The dyestuff solution of claim 1, wherein the glycol or glycol ether is selected from the group consisting of ethylene glycol, diethylene glycol, triethylene glycol, tetraethylene glycol, ethylene glycol monomethyl ether, ethylene glycol monoethyl ether, diethylene glycol monomethyl ether, diethylene glycol monoethyl ether and diethylene glycol mono-n-butyl ether.

3. The dyestuff solution of claim 1, wherein the solvent mixture is a mixture of N-methylpyrrolidone and diethylene glycol monomethyl ether, a mixture of tetramethylurea and diethylene glycol monomethyl ether, a mixture of N-methylpyrrolidone and tetraethylene glycol, or a mixture of tetramethylurea and diethylene glycol mono-n-butyl ether.

4. The dyestuff solution of claim 1, wherein the dyestuff concentration is in the range of 30 to 50% by weight, the aprotic solvent is present to the extent of 5 to 60% by weight, and the glycol or glycol ether is present to the extent of 15 to 50% by weight.

5. The dyestuff solution of claim 4, which further contains up to 50% by weight of water.

6. The dyestuff solution of claim 1, wherein the dyestuff is of the formula:

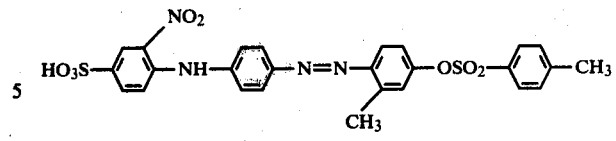

and the mixed solvent consists of dimethylsulfoxide and ethyleneglycol monomethyl ether.

7. The dyestuff solution of claim 1, wherein the dyestuff is of the formula:

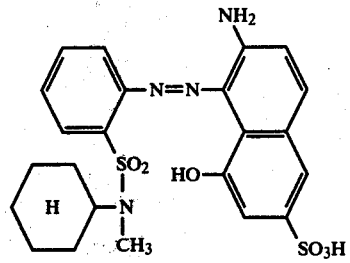

and the mixed solvent consists of tetramethylurea, dimethylsulfoxide and diethyleneglycol monomethyl ether.

* * * * *